United States Patent [19]
Dalum et al.

[11] Patent Number: 5,964,817
[45] Date of Patent: Oct. 12, 1999

[54] IMPACT CHARACTERIZING DEPLOYMENT CONTROL METHOD FOR AN AUTOMOTIVE RESTRAINT SYSTEM

[75] Inventors: Joseph Thomas Dalum, Noblesville, Ind.; Gerhard F. Wessels, Haan, Germany

[73] Assignee: Delco Electronics Corp., Kokomo, Ind.

[21] Appl. No.: 09/188,487

[22] Filed: Nov. 9, 1998

[51] Int. Cl.$^6$ .................................................. B60R 21/00
[52] U.S. Cl. ............................... 701/45; 701/46; 701/47; 280/728.1; 180/271; 180/282; 340/436; 340/667; 340/669; 340/438
[58] Field of Search ...................... 701/45–7; 340/436–8, 340/669, 667; 307/10.1, 9.1; 280/728.1, 734.5; 180/282, 271

[56] References Cited

U.S. PATENT DOCUMENTS

| | | | |
|---|---|---|---|
| 5,339,242 | 8/1994 | Reid et al. ................................. | 701/45 |
| 5,418,722 | 5/1995 | Cashler ...................................... | 701/45 |
| 5,461,567 | 10/1995 | Kelley et al. .............................. | 701/45 |
| 5,809,439 | 9/1998 | Damisch .................................... | 701/45 |

*Primary Examiner*—William A. Cuchlinski, Jr.
*Assistant Examiner*—Yonel Beaulieu
*Attorney, Agent, or Firm*—Jimmy L. Funke

[57] ABSTRACT

An improved deployment method for a vehicular restraint system having an acceleration sensor and a restraint device to be deployed for occupant protection in a crash event, where a measure of the impact severity based on the difference between the cumulative change in filtered acceleration over a predefined window, and the slope of such cumulative change, is used to characterize the crash event and to adjust the deployment threshold accordingly. Low energy impacts having a soft onset, such as an impact with a gravel pile or a low speed fill frontal impact, will produce a relatively high value of the measure, referred to herein as the Soft Impact Index, or SI Index, in the early progression of the sensed event, whereas high speed impacts that require deployment will produce a relatively low SI Index in the early progression of the event. If the SI Index exceeds a threshold early in the progression of a sensed crash event, an offset is added to the ΔV deployment threshold to reduce the likelihood of deployment, thereby increasing the system immunity to rough road and low velocity impacts. If the SI Index is below the threshold early in the progression of a sensed crash event, an offset is subtracted from the ΔV deployment threshold to provide a more timely deployment of the restraints.

8 Claims, 5 Drawing Sheets

IMPACT CHARACTERIZING DEPLOYMENT CONTROL METHOD FOR AN AUTOMOTIVE RESTRAINT SYSTEM

This invention relates to automotive restraint systems, and more particularly to a control method that differentiates deployment events from non-deployment events.

BACKGROUND OF THE INVENTION

In general, supplemental restraint systems perform a number of functions including acceleration sensing, signal processing and analysis, and deployment of one or more restraint devices such as frontal or side air bags or seat belt pretensioners in response to a sensed crash event. Typically, the acceleration signal is monitored to detect a potential crash event, and then filtered or integrated over the course of the crash event to produce a velocity change or $\Delta V$ signal. If the $\Delta V$ signal exceeds a threshold, the crash event is determined to be sufficiently severe to warrant deployment of restraints. The threshold is typically time-dependent, and is calibrated based on data logged for different types of crash events, as well as data logged during rough road driving.

A problem with the above-described approach is that it is often difficult to distinguish between deployment events such as high speed crashes and non-deployment events such as curb impacts, rough road impacts and animal impacts, since the acceleration signal associated with the non-deployment events can exceed the acceleration associated with a deployment event, particularly in the initial portion of the crash event.

SUMMARY OF THE PRESENT INVENTION

The present invention is directed to an improved deployment method for a vehicular restraint system having an acceleration sensor and a restraint device to be deployed for occupant protection in a crash event, where a measure of the impact severity based on the difference between the cumulative change in filtered acceleration over a predefined window, and the slope of such cumulative change, is used to characterize the crash event and to adjust the deployment threshold accordingly. Low energy impacts having a soft onset, such as an impact with a gravel pile or a low speed full frontal impact, will produce a relatively high value of the measure, referred to herein as the Soft Impact Index, or SI Index, in the early progression of the sensed event, whereas high speed impacts that require deployment will produce a relatively low SI Index in the early progression of the event. If the SI Index exceeds a threshold early in the progression of a sensed crash event, an offset is added to the $\Delta V$ deployment threshold to reduce the likelihood of deployment, thereby increasing the system immunity to rough road and low velocity impacts. If the SI Index is below the threshold early in the progression of a sensed crash event, an offset is applied to the $\Delta V$ deployment threshold to provide a more timely deployment of the restraints.

DETAILED DESCRIPTION OF THE DRAWINGS

Figure 1:
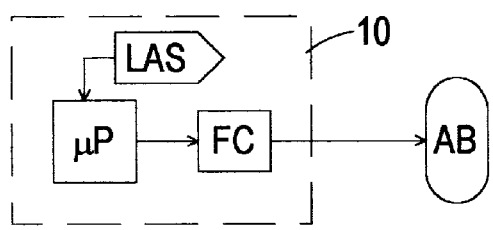
FIG. 1 is a schematic diagram of a supplemental restraint system including an acceleration sensor and a programmed microprocessor for carrying out the deployment method of this invention.

FIG. 1 generally depicts a vehicle supplemental restraint system in which one or more restraints, such as air bags AB, are deployed in a severe crash event to protect the vehicle occupants. The restraints may include without limitation, air bags, belt pretensioners, inflatable tubular structures, side curtains, anti-whiplash devices, etc., and it will be understood that such term AB as used herein does not refer exclusively to a particular type of restraint. A deployment control system, designated generally by the reference numeral 10, may be packaged as a single electronic module and mounted on a frame element in a central portion of the vehicle. Fundamentally, the system 10 includes a longitudinal acceleration sensor LAS (which may comprise a single sensor or a pair of sensors mounted at an offset angle) for sensing longitudinal acceleration of the vehicle, a microprocessor $\mu P$ for receiving the output signal of longitudinal acceleration sensor LAS, and a firing circuit FC which is triggered by microprocessor $\mu P$ to deploy the air bags AB in the event of a severe crash. In general, the microprocessor $\mu P$ filters the longitudinal acceleration signal to form a delta-velocity signal, referred to herein as $\Delta V$, and compares that signal to a threshold to determine if the air bags should be deployed. If the $\Delta V$ signal crosses the threshold, the microprocessor $\mu P$ signals the firing circuit FC to deploy the air bags AB.

According to the present invention, the microprocessor $\mu P$ additionally computes a measure of severity referred to as the Soft Impact Index, or SI Index, early in the progression of the crash event, and increases the deployment threshold by an offset value if the SI Index is indicative of a non-deployment event. In general, the SI Index is based on the difference between a first signal, referred to herein as the $\Delta \Delta V$ signal, and a second signal, referred to herein as the $\Delta \Delta V_{slope}$ signal. The $\Delta \Delta V$ signal represents the cumulative change in the filtered acceleration ($\Delta V$) signal over a predefined window, and the $\Delta \Delta V_{slope}$ signal represents the current slope of the $\Delta \Delta V$ signal.

Figure 2A:
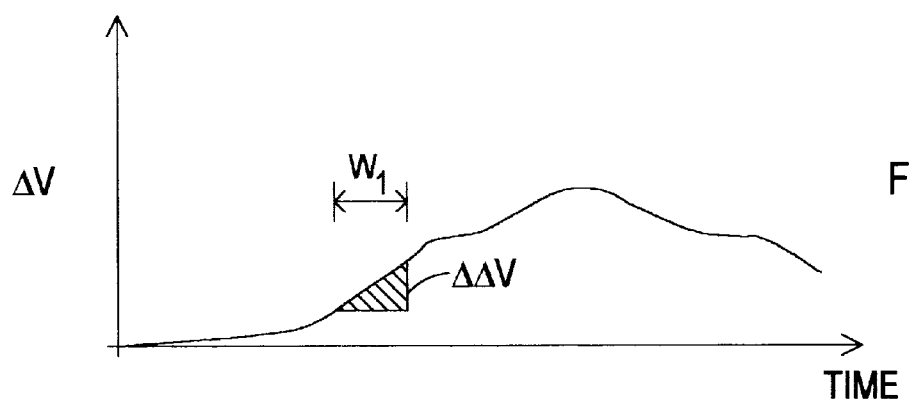
FIGS. 2A-2B graphically depict a representative $\Delta V$ signal and the corresponding cumulative change in $\Delta V$ over a predefined window as a function of time.
Figure 2B:
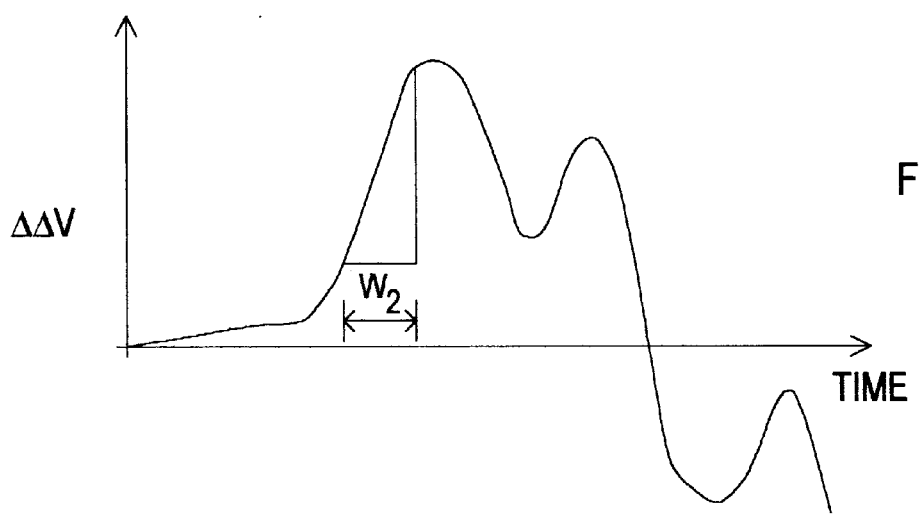

FIGS. 2A and 2B graphically depict the $\Delta \Delta V$ and $\Delta \Delta V_{slope}$ parameters. The solid trace in FIG. 2A depicts the filtered acceleration, or $\Delta V$, as a function of time, and the value of $\Delta \Delta V$ is indicated by the shaded area bounded by the $\Delta V$ curve, the window $w_1$, and the $\Delta V$ value at the trailing edge of the window $w_1$. The $\Delta \Delta V$ value so determined is depicted as a function of time by the solid trace in FIG. 2B. The $\Delta \Delta V_{slope}$ signal, in turn is defined as the change in $\Delta \Delta V$ (indicated in FIG. 2B as "y") over the window $w_2$. In a digital implementation, the windows $w_1$ and $w_2$ actually refer to a specified number of successive samples of a respective signal. Since the samples are read at a predefined rate, however, the windows $w_1$ and $w_2$ also may be viewed as a corresponding time interval. In an exemplary mechanization, the window $w_1$ may correspond to approximately 8 ms of the $\Delta V$ signal, while the window $w_2$ may correspond to approximately 6 ms of the $\Delta \Delta V$ signal.

In an exemplary digital implementation, the various parameters described above may be determined by calculation, as follows. The filtered acceleration (i.e., the ΔV signal) may be calculated according to the expression:

$$\Delta V(n) = \Sigma[c(i) * ACCEL(n-i)], \text{ for } i=0 \text{ to } (w_0-1) \quad (1)$$

where ACCEL is the acceleration signal output of acceleration sensor LAS, c is a filter coefficient, and $w_0$ is the window size. Alternatively, the ΔV signal may be determined in accordance with equations (5)–(7), described below. The cumulative change in ΔV over the window $w_1$ (i.e., the ΔΔV signal) may be calculated according to the expression:

$$\Delta\Delta V(n) = \Sigma[\Delta V(n-i) - \Delta V(n-x)], \text{ for } i=0 \text{ to } x \quad (2)$$

where $x = w_1 - 1$. The change in ΔΔV over the window $w_2$ (i.e., the $\Delta\Delta V_{slope}$ signal) may be calculated according to the expression:

$$\Delta\Delta V_{slope}(n) = \Delta\Delta V(n) - \Delta\Delta V(n-y) \quad (3)$$

where $y = w_2 - 1$. Finally, the SI Index is calculated according to the expression:

$$\text{SI Index}(n) = |\Delta\Delta V(n) - \Delta\Delta V_{slope}(n)| \quad (4)$$

The merit of the SI Index is that it helps distinguish between deployment events such as a high speed impact with a deformable barrier and non-deployment events such as gravel pile impacts and low speed frontal collisions. At the beginning of a crash event when the ΔV signal is low, the ΔΔV signal tracks the $\Delta\Delta V_{slope}$ signal until the trailing portion of the rising ΔΔV signal falls outside the slope measurement window $w_2$. The $\Delta\Delta V_{slope}$ signal then typically falls off relative to the ΔΔV signal, giving rise to the SI Index. Low energy impacts having a soft onset, such as an impact with a gravel pile or a low speed full frontal impact will produce a relatively high SI Index in the early progression of the crash, whereas high speed impacts that require deployment will produce a relatively low SI Index in the early progression of the crash. If the crash event is characterized by a relatively high value of the SI Index in the early progression levels of the crash, the deployment threshold is increased to increase immunity to rough road and low velocity impacts. On the other hand, if the crash event is characterized by a relatively low value of the SI Index early in the progression level of the crash, the deployment threshold is lowered to provide faster deployment in high speed crash events. The progression of the crash event may be determined, for example, as a function of elapsed time after the ΔV signal exceeds a certain threshold, or as a function of the magnitude of a ΔV related signal.

Figure 3:
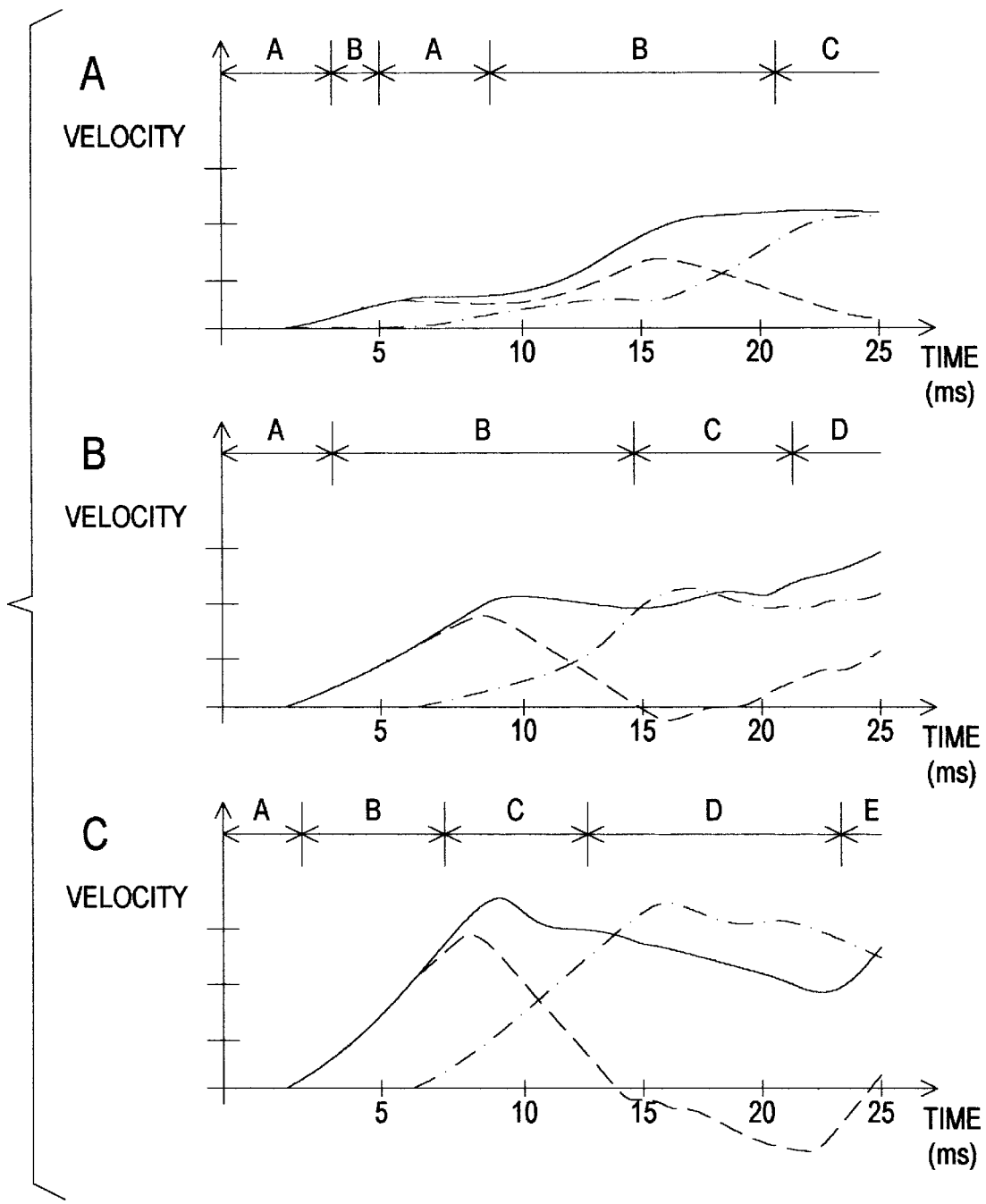
FIG. 3, Graphs A–C, depict the SI Index and related velocity signals for three different crash events.

Examples of the above described signals for different types of crash events are shown in Graphs A–C of FIG. 3; the ΔΔV signal is represented by a solid trace, the $\Delta\Delta V_{slope}$ signal by a broken trace, and the SI Index by a dot chain trace. Graph A shows the traces for a gravel pile impact, Graph B shows the traces for a low speed frontal impact, and Graph C shows the traces for a high speed impact. The progression level for each event is indicated by the regions A–D at the top of each graph. In the non-deployment events of Graphs A and B, it will be seen that the SI Index has a relatively high value (about 140 in Graph A, and about 180 in Graph B) early in the progression of the respective event, during progression level B, for example. However, in the deployment event of Graph C, the SI Index has a relatively low value (about 25) at the same progression level.

In Graphs A–C of FIG. 3, the event progression level is determined by computing a velocity signal $\Delta V_{bias}$ that is biased toward zero when the filtered acceleration is near zero. The biased velocity signal $\Delta V_{bias}$ may be determined by computing a filtered acceleration signal $\Delta V_f$, and then applying a bias "B". For example, $\Delta V_f$ may be calculated according to the expression:

$$\Delta V_f(n) = \Delta V_f(n-1) + ACCEL(n) - \Delta V_f(n-1)/C \quad (5)$$

where C is a constant, with $\Delta V_{bias}$ being defined as:

$$\Delta V_{bias} = \Delta V_f - B \quad (6)$$

and the bias B being defined as:

$$B = \begin{cases} d & \text{if } \Delta V_f > d, \text{ with } d \text{ being a positive integer} \\ \Delta V_f & \text{if } |\Delta V_f| \le d \\ -d & \text{if } \Delta V_f < -d \end{cases} \quad (7)$$

Figure 4:
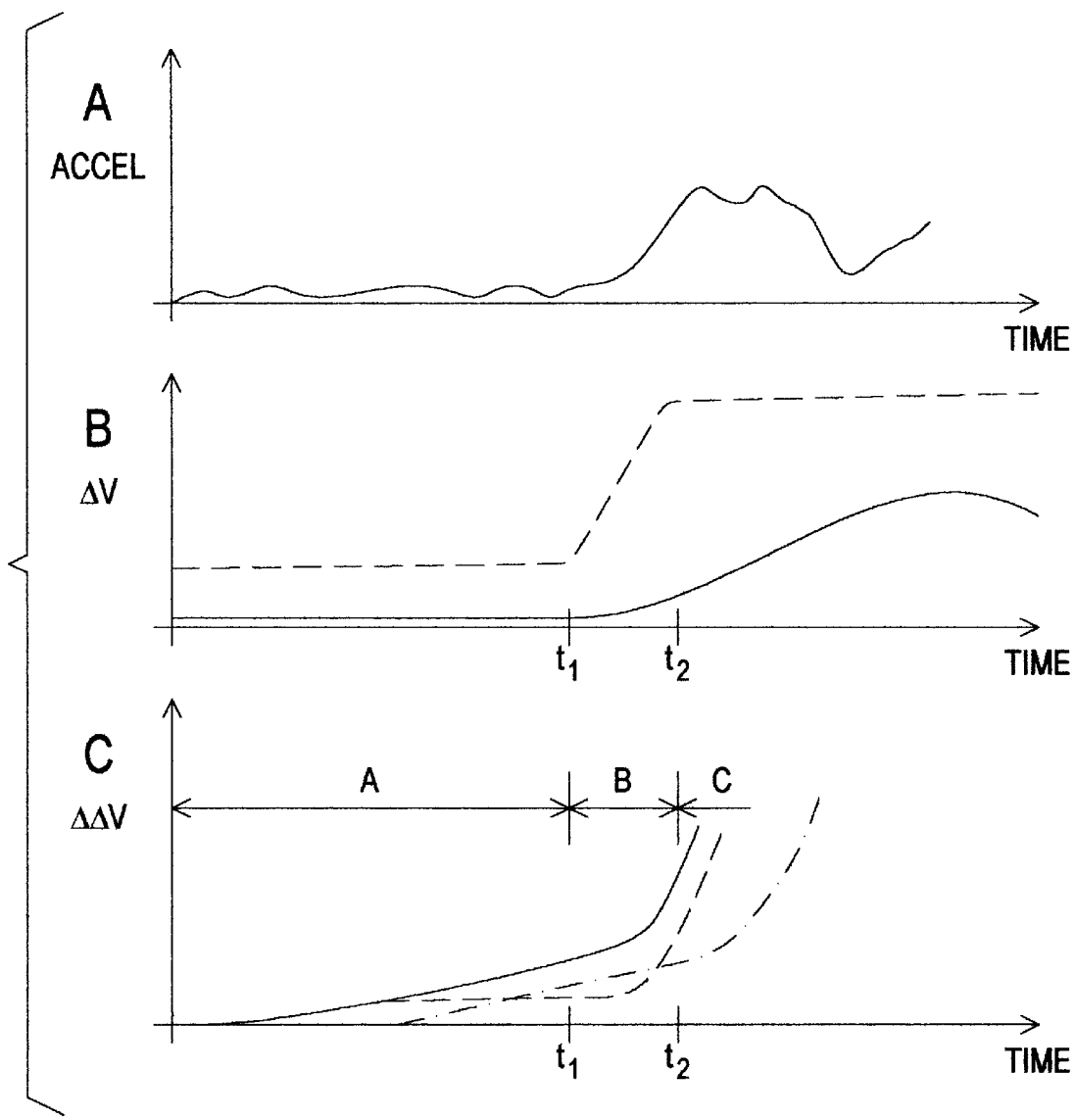
FIG. 4, Graphs A–C, depict the SI Index and related velocity signals and the deployment threshold for a non-deployment event.

FIG. 4, Graphs A–C, graphically depict the operation of the invention for nondeployment event, such as a low speed frontal crash. Graph A depicts the acceleration signal ACCEL. Graph B depicts the corresponding ΔV signal (solid trace) and a deployment threshold (broken trace). Graph C depicts the ΔΔV signal (solid trace), the $\Delta\Delta V_{slope}$ signal (broken trace), and the SI Index (dot-chain trace). The progression level for the event is indicated by the regions A–C at the top of Graph C. As discussed in reference to FIG. 3, the value of the SI Index in the progression level B is used to characterize the event and adjust the deployment threshold accordingly. In this case, the SI Index has a relatively high value in progression level B, and the deployment threshold is adjusted upward during the interval $t_1$–$t_2$ as shown in Graph B. The adjustment has the effect of reducing the likelihood of deployment in response to events characterized by the relatively high SI Index, thereby increases the system immunity to low velocity impacts.

Figure 5:
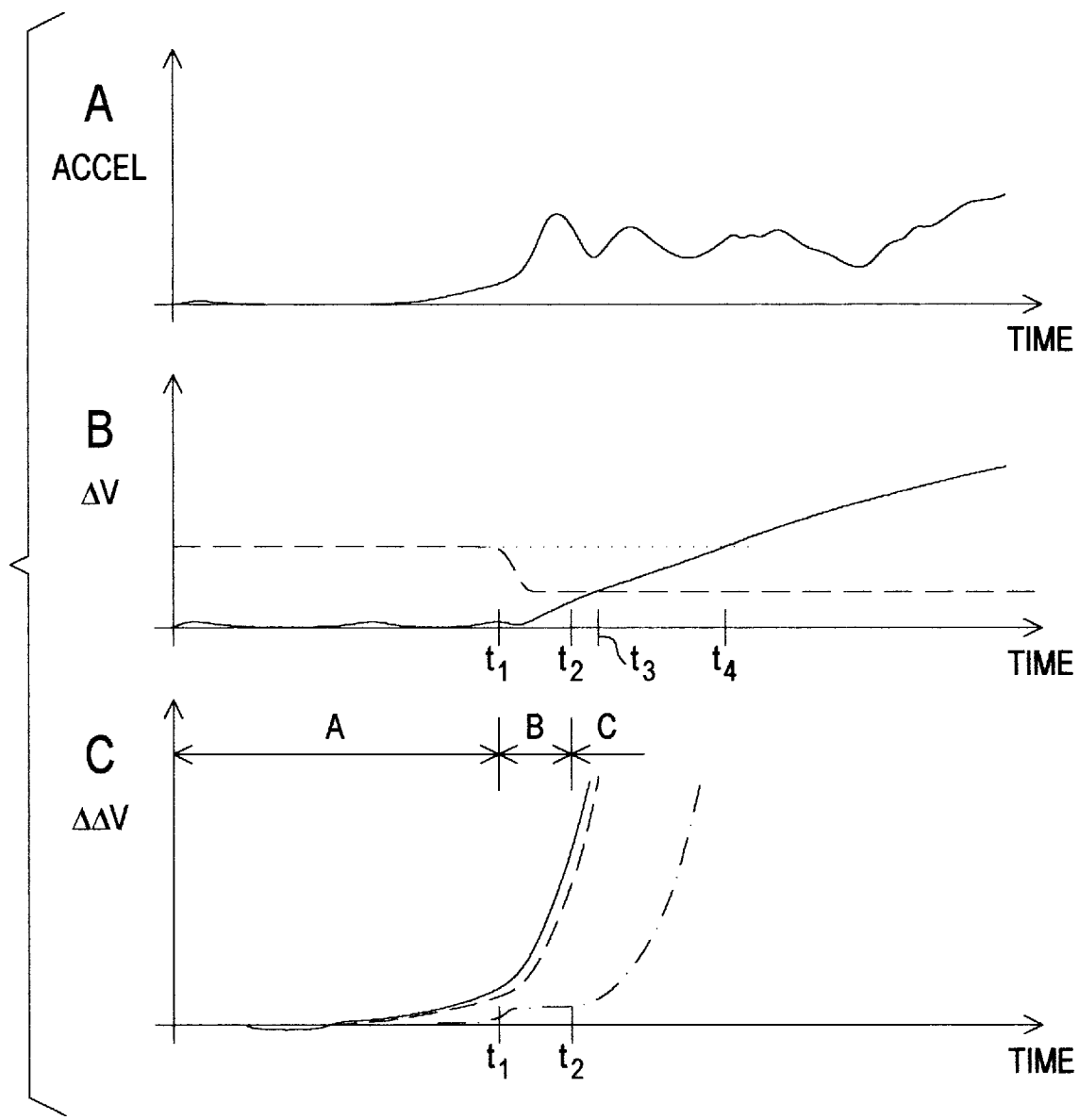
FIG. 5, Graphs A–C, depict the SI Index and related velocity signals and the deployment threshold for a deployment event.

FIG. 5, Graphs A–C, graphically depict the operation of the invention for deployment event, such as a 64.5 KPH frontal crash. The trace identification convention is the same as used for Graphs A–C of FIG. 4. In this case, the SI Index has a relatively low value in progression level B, and the deployment threshold is adjusted downward during the interval $t_1$–$t_2$ as shown in Graph B. The decrease in the deployment threshold leads to an earlier deployment of the restraints AB at time $t_3$; without the threshold adjustment, the restraints AB would be deployed at time $t_4$, as indicated by the dotted extension of the initial threshold level.

Figure 6:
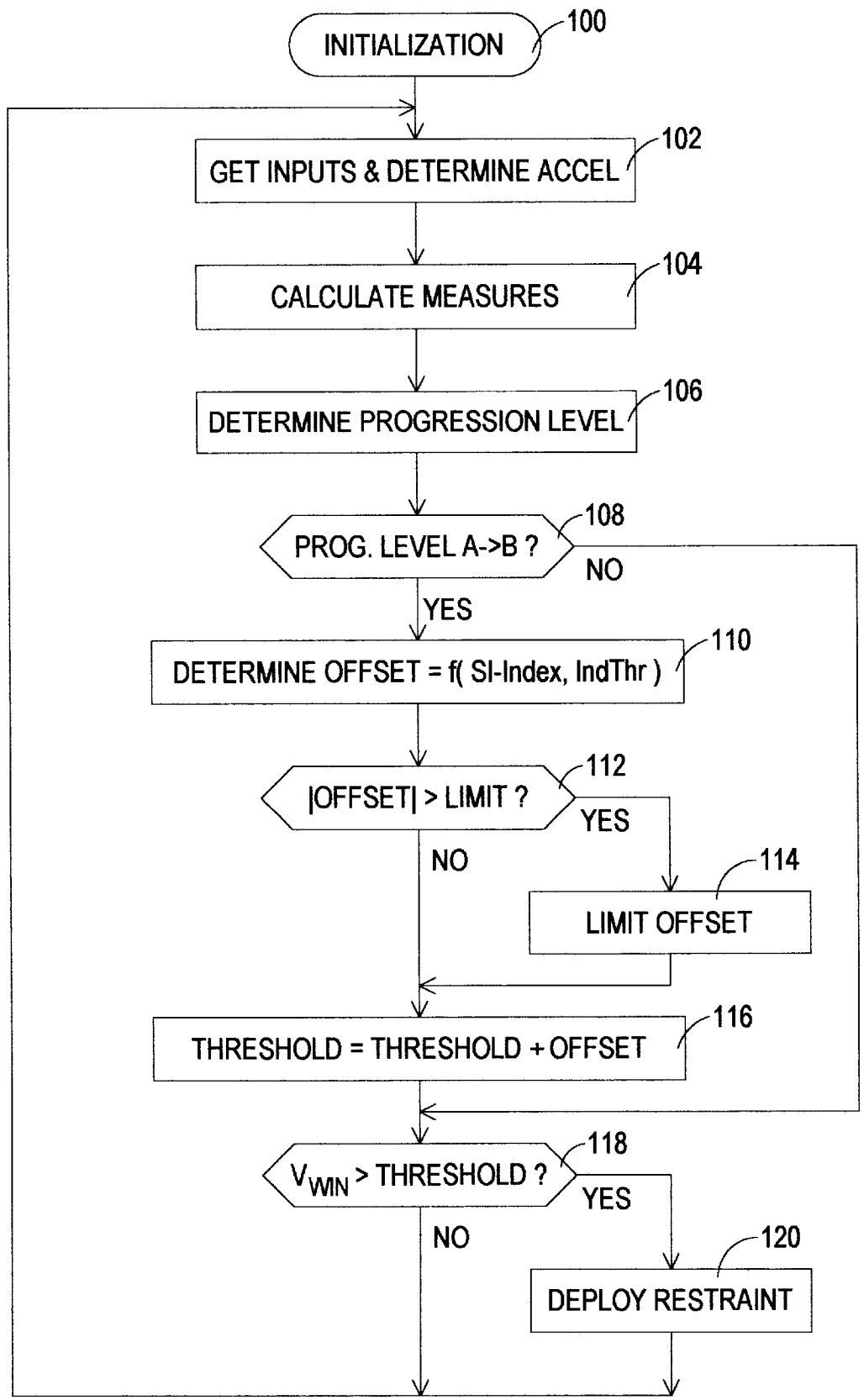
FIG. 6 depicts a flow diagram representative of computer program instructions executed by the microprocessor of FIG. 1 in carrying out the deployment method of this invention.

A flow diagram representative of computer program instructions executed by the microprocessor μP of FIG. 1 in carrying out the above-described deployment method is set forth in FIG. 6. The block 100 designates a series of instructions executed at the initiation of vehicle operation for initializing various registers, counters, flags and variables to a pre-defined state. Thereafter, the block 102 is executed to read the output signal of the longitudinal acceleration sensor LAS, and to filter it to form a filtered acceleration signal ACCEL. The various severity measurements are then computed at block 104; these include, for example, ΔV, ΔΔV, SI Index, and $\Delta V_{bias}$. Block 106 is then executed to determine the progression level of the sensed event, based for example, on the value the biased velocity signal $\Delta V_{bias}$ relative to a series of predefined progression thresholds as described above. So long as the sensed event is in progression level B, as detected by block 108, the blocks 110–116 are periodically executed to determine an offset value, suitably limit the offset value and adjust the deployment threshold in accordance with the limited offset. As indicated at block 110, the offset is determined as a function of the determined SI Index and an index threshold IndThr. This, of course involves a comparison of the SI Index to the threshold IndThr. If SI Index exceeds IndThr, the offset has a positive value; if SI Index is below IndThr, the offset has a negative value. In certain applications, it may be desired to limit the offset to only positive or only negative values. In the preferred embodiment, the value of the offset can be either positive or negative, and is determined in proportion to the amount by which SI Index deviates from IndThr. In such case, blocks 112–114 serve to limit the determined offset so that its absolute value is less than a predetermined maximum value. Alternatively, the offset may be assigned a fixed value; in such case, the limiting steps of blocks 112–114 are not necessary. Finally, the $\Delta V$ signal is compared to the deployment threshold at block 118. If the $\Delta V$ signal exceeds the threshold, the block 120 is executed to deploy the restraints AB.

In summary, the deployment method of this invention overcomes the problem of distinguish between deployment events such as high speed crashes and non-deployment events such as curb impacts, rough road impacts and animal impacts, by using the SI Index to characterize the crash event and adjust the deployment threshold accordingly. As a result, the system immunity to non-deployment events is increased, and the restraints are deployed in a more timely manner in deployment events. While described in reference to the illustrated embodiment, it is expected that various modifications in addition to those suggested above will occur to those skilled in the art. In this regard, it will be understood that this invention is not limited to the illustrated embodiment, and that deployment methods incorporating such modifications may fall within the scope of this invention, which is defined by the appended claims.

The embodiments of the invention in which an exclusive property or privilege is claimed are defined as follows:

1. In a vehicular supplemental restraint system having a sensor providing a vehicle acceleration signal, a restraint device and a controller for deploying the restraint device for vehicle occupant protection in a crash event if a measure of crash severity based on the acceleration signal exceeds a threshold, the improvement wherein the controller:

filters the acceleration signal to form a $\Delta V$ signal, and determines a cumulative change in the $\Delta V$ signal over a first predefined interval;

determines an impact index according to a difference between the determined cumulative change in the $\Delta V$ signal and a rate of change of the determined cumulative change over a second predetermined interval in the course of the crash event, the impact index having a predeterminded high value at a predefined progression level of a crash event for which deployment is not desired, and a predeterminded low value at a predefined progression level of a crash event for which deployment is desired;

determines a crash progression level during the crash event based on the acceleration signal; and compares the determined impact index to an index threshold when the crash progression level has attained the predefined progression level, and adjusts the deployment threshold by an offset amount during the crash event based on the comparison so as to either decrease a likelihood of deployment in a crash event for which deployment is not desired, or provide earlier deployment in a crash event for which deployment is desired.

2. The improvement of claim 1, wherein the controller increases the deployment threshold by the offset amount to decrease the likelihood of deployment when the comparison indicates that the determined impact index exceeds the index threshold.

3. The improvement of claim 2, wherein said offset amount is determined in relation to an amount by which the determined impact index exceeds the index threshold.

4. The improvement of claim 1, wherein the controller decreases the deployment threshold by the offset amount to provide earlier deployment when the comparison indicates that the determined impact index is below the index threshold.

5. The improvement of claim 4, wherein said offset amount is determined in relation to an amount by which the determined impact index is below the index threshold.

6. The improvement of claim 1, wherein said cumulative change in the $\Delta V$ signal is determined according to the expression:

$$\Sigma[\Delta V(n-i) - \Delta V(n-x)], \text{ for } i=0 \text{ to } x$$

where $w_1$ is said first predefined interval, and x is defined as $w_1 - 1$.

7. The improvement of claim 1, wherein said rate of change of the determined cumulative change in the $\Delta V$ signal is determined according to the expression:

$$\Delta\Delta V(n) - \Delta\Delta V(n-y)$$

where $\Delta\Delta V$ is the cumulative change in filtered acceleration, $w_2$ is said second predefined interval, and y is defined as $w_2 - 1$.

8. The improvement of claim 1, wherein:

the cumulative change in the $\Delta V$ signal, $\Delta\Delta V(n)$, is determined according to the expression:

$$\Sigma[\Delta V(n-i) - \Delta V(n-x)], \text{ for } i=0 \text{ to } x$$

where $w_1$ is said first predefined interval, and x is defined as $w_1 - 1$;

the rate of change, $\Delta\Delta V_{slope}(n)$, is determined according to the expression:

$$\Delta\Delta V(n) - \Delta\Delta V(n-y)$$

where $W_2$ is said second predefined interval, and y is defined as $W_2 - 1$; and the impact index is determined according to the expression:

$$|\Delta\Delta V(n) - \Delta\Delta V_{slope}(n)|.$$

* * * * *